United States Patent
Walker, Jr. et al.

(10) Patent No.: US 6,245,141 B1
(45) Date of Patent: Jun. 12, 2001

(54) TANNIN STAIN INHIBITING COATING COMPOSITION

(76) Inventors: Joseph Kennedy Walker, Jr., 9314 Creekwood Dr., Mentor, OH (US) 44060; Catherine A. Scott, 29590 Broxbourne Rd., North Olmsted, OH (US) 44070

( * ) Notice: Subject to any disclaimer, the term of this patent is extended or adjusted under 35 U.S.C. 154(b) by 0 days.

(21) Appl. No.: 09/413,556

(22) Filed: Oct. 6, 1999

(51) Int. Cl.$^7$ .............................. C09D 5/00; C08K 5/56
(52) U.S. Cl. ................ 106/499; 106/287.19; 427/429; 428/537.1; 556/54; 556/56
(58) Field of Search .................. 106/499, 287.19; 427/429; 428/537.1; 556/51, 54, 56

(56) References Cited

U.S. PATENT DOCUMENTS

| | | | |
|---|---|---|---|
| 3,852,087 | 12/1974 | Nordyke et al. | 106/288 B |
| 3,969,293 * | 7/1976 | White et al. | 524/414 |
| 4,218,516 | 8/1980 | Meyer et al. | 428/537 |
| 4,622,073 * | 11/1986 | Hashizume | 106/403 |
| 4,732,817 | 3/1988 | Lotz et al. | 428/541 |
| 5,008,362 | 4/1991 | Wilharm et al. | 528/28 |
| 5,028,489 | 7/1991 | Kissel | 428/469 |
| 5,041,486 | 8/1991 | Kissel | 524/377 |
| 5,108,736 * | 4/1992 | Schlossman | 424/64 |
| 5,135,780 | 8/1992 | Kissel | 427/404 |
| 5,158,605 | 10/1992 | Kissel | 106/14.11 |
| 5,162,413 | 11/1992 | Kissel | 524/337 |
| 5,166,248 | 11/1992 | Kissel | 524/398 |
| 5,175,202 | 12/1992 | Kissel | 524/398 |
| 5,198,487 | 3/1993 | Kissel | 524/403 |
| 5,320,872 | 6/1994 | McNeel et al. | 427/393 |
| 5,460,644 | 10/1995 | Thomassen | 106/18.32 |
| 5,527,619 | 6/1996 | Rokowski et al. | 428/452 |
| 5,529,811 * | 6/1996 | Sinko | 427/440 |
| 5,656,070 | 8/1997 | Clough | 106/14.41 |
| 5,681,880 | 10/1997 | Desor et al. | 524/320 |
| 5,733,666 | 3/1998 | Sinko | 428/537.1 |
| 5,759,705 | 6/1998 | Sinko | 428/537.1 |
| 5,922,777 | 7/1999 | Van Rheenen | 521/28 |

FOREIGN PATENT DOCUMENTS 57-207651 * 12/1982 (JP).
63-205376 * 8/1988 (JP).

* cited by examiner

*Primary Examiner*—Anthony Green
(74) *Attorney, Agent, or Firm*—Vivien Y. Tsang; Paul R. Katterle; Robert E. McDonald

(57) ABSTRACT

An aqueous tannin stain-inhibiting coating composition comprising a titanate coupling agent. Also, a process for inhibiting tannin staining in a tannin-containing substrate is disclosed which involves applying to the substrate a coating composition comprising a titanate coupling agent.

23 Claims, No Drawings

TANNIN STAIN INHIBITING COATING COMPOSITION

An aqueous tannin stain-inhibiting coating composition comprising a titanate coupling agent. Also, a process for inhibiting tannin staining in a tannin-containing substrate is disclosed which involves applying to the substrate a coating composition comprising a titanate coupling agent.

FIELD OF THE INVENTION

This invention relates to an aqueous coating composition for tannin-containing substrates, wherein the composition inhibits the tannin staining of coatings and paints applied to tannin-containing substrates, particularly latex paints applied to outdoor wood surfaces. The coating composition of this invention comprises a titanate coupling agent. This invention also relates to a process for inhibiting tannin staining in a tannin-containing substrate and, more particularly, to a process for inhibiting tannin staining in a tannin-containing substrate by applying to the substrate a coating composition comprising a titanate-coupling agent. When the composition of this invention is applied to tannin-containing substrates, the quality of subsequently applied water-based coatings also improves.

BACKGROUND OF THE INVENTION

Tannins and other chromophoric extractives are naturally occurring materials occurring in wood-based products. These chromophoric materials are present in Western Red Cedar, Redwood Oak, and, White and Yellow Pine, to name a few. They are also present in wood composition products such as paper, cardboard, plywood, particle board, chip board, strand board and Masonite.

When protective film-forming finishes including paints, lacquers, and varnishes are applied to wood having a high content of water-soluble tannin, such as redwood, cedar, oak, or mahogany, the tannin often bleeds or migrates into the surface film, causing a dark stain in the film. Tannin staining, an undesirable process which results in aesthetic degradation and loss of decorative value of protective coatings, is a problem frequently encountered with coatings applied on wood substrates. It is observed usually as yellow-brown coloration or as randomly distributed brown-colored spots on coatings, and more particularly, on coated wood substrates exposed to high, typically condensing, humid conditions.

Water soluble tannins or tannic acids, natural compounds of complex and non-uniform composition, are the staining species involved, which are abundantly present especially in redwood substrates. Tannin staining includes several concurrent processes: water or vapor penetration of wood substrates, solubilization, diffusion into the coating and darkening of the deposited air-exposed tannin species, among others. It is significant to observe in this sense that the rate of staining is diffusionally controlled and its extent is significantly dependent on the substrate's tannin concentration.

By definition, staining inhibition implies a coating system's capacity to interact with dissolved tannin species and interfere with related diffusion processes. There are specialized pigment grade products known in the prior art as "blockers of tannin" or "stain inhibitors", which as functional components of water or solvent based paint formulations, provide such protective capacity to coatings systems applied on wood substrates. Sulfonium compounds have been disclosed as useful in blocking tannin migration in wood substrates (U.S. Pat. Nos. 3,636,052; 3,660,431 and 3,900,619). Highly cross-linked ion exchange resins have been incorporated into aqueous coating compositions applied to cedar and redwood type substrates (U.S. Pat. No. 3,494,878). Aqueous solutions of nonlinear polyalkylene-imines or linear, partially deacylated poly(N-acryl) alkyleneimines have also been used to inhibit tannin migration in wood substrates (U.S. Pat. Nos. 4,075,394 and 4,104,228 respectively). Amphoteric compounds of alumina, titania, zirconium, silica or zinc have been incorporated into certain composite pigments to inhibit the migration of water-soluble tannins through paint film (U.S. Pat. Nos. 3,852,087, 3,969,293, 4,021,398, 5,176,894, 5,529,811). In European Patent Application No. EP 622427 is disclosed a styrene-butadiene latex that exhibits tannin blocking properties. In U.S. Pat. No. 4,218,516, magnesium hydroxide is applied to a wood substrate, forming a leach-resistant magnesium hydroxide-tannin complex. In U.S. Pat. No. 5,460,644 is disclosed a zinc/ammonia salt that provides tannin stain-blocking properties. Also, in U.S. Pat. No. 5,527,619 is disclosed an organosilane-modified coating to block tannin staining in water-based and solvent-based coatings. Reactive pigments have also been incorporated into coatings, but reactive pigments have limitations such as causing instability problems, such as viscosity increase and polymer gelation, as well as being known to be environmentally unfriendly. Also, stain inhibitors containing specified metal hydrates as functionally active additives function essentially by reducing the permeability of coating systems and, thus display relatively limited tannin stain inhibitive capacity. U.S. Pat. No. 5,141,784 discloses a process for treating wooden substrates having leachable chromophoric substances by applying an effective amount of a carboxylic acid salt and/or a water soluble organic compound bearing one or more salt-forming amine groups and having a molecular weight of about 50 to about 300,000. U.S. Pat. No. 5,051,283 discloses a surface treating composition for wooden surfaces that inhibits leachable compositions from staining after-applied water-base coating comprising about 1% to about 25% by weight of an alkali metal salt of a monobasic or dibasic carboxylic acid and about 1% to about 50% by weight of a water soluble organic compound bearing one or more salt-forming amine groups and having a molecular weight of about 50 to about 300,000 and from about 25% to about 98% water. International Application Number PCT/US/00643 discloses a polymeric composition containing at least one acid-functional vinyl polymer and at least one amino-functional siloxane polymer. The blended polymeric compositions are able to provide various substrates with surface coatings that are characterized as quasi-crosslinked, alkali-soluble polymeric networks exhibiting enhanced surface properties. Also disclosed are methods of producing the blended polymeric composition. Japanese Patent Application J 03-064305A discloses a composition consisting of a carboxyl-group-containing, water-soluble resin, macromolecular aqueous dispersion and water-soluble silane coupling agent containing an amino group in the molecule in which the carboxyl-group containing, water soluble resin has an acid value of 30–800 and the amounts per 100 solid weight parts of the macromolecular aqueous dispersion of 0.2–2.0 weight parts of the aqueous resin and 0.–13 weight parts of the amino-group containing silane coupling agent are compounded.

It has been found, in accordance with this invention, that a beneficial tannin inhibiting effect is obtainable by utilizing a aqueous coating composition comprising a titanate coupling agent, preferably, an organotitanate. The process, in accordance with the this invention, for inhibiting tannin staining of coatings and paints involves applying to tannin-containing substrates, such as, for example, wood, cardboard, paper, wood composition particle board, Masonite, and the like. Although several systems for inhibiting tannin migration in tannin-containing wood substrates are known, none use or suggest the use of a titanate coupling agent as an effective tannin stain inhibiting agent. Also disclosed is a pigment composition comprising a titanate coupling agent.

SUMMARY OF THE INVENTION

This invention is directed to an aqueous coating composition for inhibiting tannin staining of paints and coatings in tannin-containing substrates, wherein said aqueous coating composition comprises a titanate coupling agent.

In accordance with this invention there is provided a process for inhibiting tannin staining of paints and coatings in a tannin-containing substrate which comprises the step of applying to the substrate an aqueous coating composition comprising a titanate coupling agent.

Also in accordance with this invention there is provided an aqueous coating composition for inhibiting tannin staining of paints and coatings in a tannin-containing substrate which comprises a pigment comprising a titanate coupling agent.

In addition, this invention provides a process for inhibiting tannin staining of paints and coatings in a tannin-containing substrate which comprises the step of applying to the substrate an aqueous coating composition comprising a pigment comprising a titanate coupling agent in an amount effective to inhibit the migration of tannins from said substrate into said finish.

This invention is also directed to a coating composition for inhibiting tannin staining in tannin-containing substrates, wherein said coating composition comprises a pigment comprising a titanate coupling agent which has at least one amine functionality.

Furthermore, this invention is also directed to a process for inhibiting tannin staining in a tannin-containing substrate which comprises applying to the substrate an aqueous coating composition comprising a pigment comprising a titanate coupling agent having at least one amine functionality, in an amount effective to inhibit the migration of tannins from said substrate into said finish.

Still further, this invention is also directed to a coated substrate comprising a substrate having tannin and an aqueous coating composition applied to the substrate comprising at least one titanate coupling agent in an amount effective to inhibit the migration of tannins from said substrate into said finish.

Still further, this invention is also directed to a coated substrate comprising a substrate having tannin and an aqueous coating composition applied to the substrate comprising a pigment comprising at least one titanate coupling agent in an amount effective to inhibit the migration of tannins from said substrate into said finish.

Additionally, this invention is directed to a pigment composition for inhibiting tannin staining in tannin-containing substrates, wherein said pigment composition comprises a titanate coupling agent.

Additionally still, this invention is directed to a pigment composition for inhibiting tannin staining in tannin-containing substrates, wherein said pigment composition comprises a titanate coupling agent which has at least one amine functionality.

DETAILED DESCRIPTION OF THE INVENTION

This invention relates to a coating composition comprising a titanate coupling agent. This invention also relates to a process for inhibiting tannin staining in a tannin-containing substrates. The combination of the titanate coupling agent with a aqueous polymer creates a coating that effectively prevents tannin stains from migrating into after-applied water-based finishes.

Aqueous coating compositions in accordance with this invention are polymers including homopolymers, copolymers, terpolymers and/or mixtures thereof, of acrylic acid esters and methacrylic acid esters having 1–15 carbon atoms, specifically, methyl acrylate, ethyl acrylate, butyl acrylate, 2-ethyl hexyl acrylate, methyl methacrylate, ethyl methacrylate, vinyl acetate, ethylene oxide, vinyl chloride, epoxy, and butyl methacrylate, and vinyl-acrylic acid esters and vinyl methacrylic acid esters. The aqueous polymer useful in this invention may be prepared via any processes known in the art, such as, for example, by emulsion polymerization. It is also possible to use monomers in relative small amounts, such as for example, between 0.1% and 10% by weight, which, in addition to the ethylenic unsaturation, may also contain other reactive groups, hydroxyl groups, alkoxymethyl amide groups, such as for example, N-methylolacrylamide, N-methylolmethacrylamide, n-butoxymethyl acrylamide, n-butoxymethyl methacrylamide, or epoxy groups, and the like.

The aqueous tannin-inhibiting coating composition in accordance with the present invention includes a titanate coupling agent. The titanate coupling agent is added to the resin or polymer, to the pigment, or to the composition after the pigment has been dispersed into the resin or polymer.

The compositions useful in the present invention can also be prepared by adding an effective amount of a titanate coupling agent to a pigment in situ, whereby the titanate coupling agent is added to the pigment during the grinding stage, and homogeneously mixed. The concentration of the titanate coupling agent in a coating composition may vary widely, depending on the type of wood to be treated and the degree of stain inhibition required. The preferred level of titanate coupling agent added to the pigment is from about 0.1% to about 2% by weight, based on the total weight of the pigment. After grinding the pigment with the titanate coupling agent, a dispersion can be formed by the addition of resins or polymers and other additives normally found in latex paints. A titanate coupling agent is present in an amount effective to inhibit the migration of tannins from said substrate into said finish. The preferred titanate coupling agent added to the aqueous polymer or pigment is an organotitanate. When added to the pigment, the preferred level of organotitanate is from about 0.1% to about 5%, more preferably, from about 0.1% to about 2%, based on the weight of the pigment.

In general, organotitanates are organic materials containing titanium. Organotitanates found to effective for improved tannin stain blocking in unpigmented and pigmented water-based coatings include aminotitanates and neoalkoxytitanates, such as neoalkoxy-tri[N-ethylaminoethylamino)] titanate (available as LICA 44 from Kenrich Petrochemicals, neoalkoxytri(dioctylphosphato) titanates (available as LICA 12 and LICA 38 from Kenrich Petrochemicals), and the like. Organotitanates having amine-functionality, or multiple amine functionalities such as diamines, triamines, tetraamines, etc., are also preferred. More preferred are organotitanates having mutiple amine functionalities, such as the diamines, triamines, tetramines, etc.

The following non-limiting examples are provided to further illustrate the coatings prepared according to the present invention and useful in tannin stain blocking systems. These examples are intended to be illustrative of the present invention and are no way intended to limit the scope of such except as further delineated in the claims.

Test Method for Tannin Stain Blocking

Staining substrates such as dark-staining cedar and Redwood are used in this test and are planed and sanded. Boards are chosen with a consistent grain pattern across the length of the board to avoid variability in the test. The test panel is divided into equal sections. Test primers are applied by brush to equal spread rate (i.e. approximately 400 square feet per gallon determined by weighing of the test paint) and allowed to dry. A high-hiding topcoat paint, which permits the passage of tannins, is then applied to the entire panel, also at 400 square feet per gallon. The panel is then immediately placed in a sealable, 12 cubic foot misting chamber for continuous misting with 40° F. water. The panel is allowed to remain in the misting chamber for 16 hours. The panel is then removed from the misting chamber, and allowed to dry for at least 16-24 hours. The panel is then rated for tannin stain blocking.

A water-based tannin stain blocking pigmented primer paint, (38.9% pigment volume concentration; 32.7% volume solids) is used as a control, in all examples which contain titanate coupling agents.

Tannin stain blocking can be measured qualitatively by visually comparing the test panels to the control, and ranking each panel on a scale of 1 to 8 (1=best; 8=worst) In this method of judging tannin stain blocking, two (±2) units are considered significantly different.

Example 1 of Tannin Stain Blocking of Paints

Pigmented paint samples were modified with 0.5%, 0.75% and 1.0% by weight of LICA 44 and tested for tannin stain blocking. The emulsion composition is 48% by weight butyl acrylate, 50% by weight methyl methacrylate, 1–2% by weight methacrylic acid, and 1–2% by weight acrylic acid. The paint formulation is 19.5% pigment volume concentration and 37.4% volume solids.

| Sample ID | Description | Rating (1–8) (1 = best/8 = worst) | | | | | |
|---|---|---|---|---|---|---|---|
| | | #1 | #2 | #3 | #4 | #5 | Total |
| A | Control 0% LICA 44 | 6 | 8 | 8 | 8 | 8 | 38 |
| B | 0.5% LICA 44 | 1 | 4 | 4 | 4 | 3 | 16 |
| C | 0.75% LICA 44 | 3 | 4 | 2 | 1 | 1 | 11 |
| D | 1.0% LICA 44 | 2 | 1 | 7 | 2 | 2 | 14 |

The addition of neoalkoxy-tri[N-ethylaminoethylamino) titanate (LICA 44) improves tannin stain blocking of pigmented coatinags as evidenced by rating values. The lower the value in a rank sum analysis evidences a more effective stain blocking effect. The coatings containing the titanate coupling agent effectively blocked and prevented tannin from migrating into the coating. The control did not prevent the tannin stains from migrating into the applied coatings.

Example 2

Tannin Stain Blocking of Pigmented Primers on Redwood—LICA 44 compared to Z6020

The polymer composition is as in Example 1.

| Sample ID | Description | Rating (1–8) (1 = best/8 = worst) | | | | | |
|---|---|---|---|---|---|---|---|
| | | #1 | #2 | #3 | #4 | #5 | Total |
| A | Control 0% LICA 44 | 6 | 8 | 8 | 8 | 8 | 40 |
| B | 0.5% LICA 44 | 1 | 4 | 4 | 4 | 3 | 16 |
| | 0.5% Z-6020 | 6 | 3 | 5 | 4 | 6 | 23 |
| D | 1.0% LICA 44 | 2 | 1 | 7 | 2 | 2 | 14 |
| | 1.0% Z-6020 | 8 | 6 | 4 | 8 | 4 | 30 |

The addition of neoalkoxy-tri[N-ethylaminoethylamino) titanate (LICA 44) improves tannin stain blocking of pigmented coatings as compared to aminoethylaminopropyltrimethoxysilane (Z-6020) as evidenced by rating values. The lower the value in a rank sum analysis evidences a more effective stain blocking effect. The coatings containing the titanate coupling agent effectively blocked and prevented tannin from migrating into the coating. The control did not prevent the tannin stains from migrating into the applied coatings.

We claim:

1. An aqueous coating composition for inhibiting tannin migration in tannin-containing substrates comprising a neoalkoxytitanate coupling agent in an amount effective to inhibit the migration of tannins from the tannin containing substrates.

2. The coating composition of claim 1, wherein the neoalkoxytitanate coupling agent has at least one amine functionality.

3. The coating composition of claim 2, wherein the neoalkoxytitanate coupling agent is neoalkoxy-tri(N-ethylaminoethylamino) titanate.

4. The coating composition of claim 1, wherein the neoalkoxytitanate coupling agent is neoalkoxy-tri (dioctylphosphato) titanate.

5. An aqueous coating composition for inhibiting tannin migration in tannin-containing substrates, comprising a pigment comprising a neoalkoxytitanate coupling agent.

6. The coating composition of claim 5, wherein the neoalkoxytitanate coupling agent has at least one amine functionality.

7. The coating composition of claim 6, wherein the neoalkoxytitanate coupling agent is neoalkoxy-tri(N-ethylaminoethylamino) titanate.

8. The coating composition of claim 5, wherein the neoalkoxytitanate coupling agent is neoalkoxy-tri (dioctylphosphato) titanate.

9. The coating composition of claim 5, wherein the neoalkoxytitanate coupling agent is about 0.1% by weight to about 2% by weight based on the weight of said pigment.

10. A process of inhibiting the staining of a film-forming finish applied to a tannin-containing substrate which comprises the step of applying to the substrate an aqueous coating composition comprising a pigment comprising a organotitanate coupling agent in an amount effective to inhibit the migration of tannins from said substrate into said finish.

11. The process of claim 10, wherein said organotitanate coupling agent is about 0.1% by weight to about 2% by weight, based on the weight of said pigment.

12. The process of claim 10 wherein said organotitanate has at least one amine functionality.

13. The process of claim 10 wherein said organotitanate is a neoalkoxytitanate.

14. The process of claim 13 wherein said neoalkoxytitanate is selected from the group consisting of neoalkoxy-tri(N-ethylaminoethylamino) titanate and neoalkoxy-tri(dioctylphosphato) titanate.

15. A coated substrate comprising:
    (a) a substrate containing tannin; and
    (b) an aqueous coating composition on said substrate comprising a pigment comprising a organotitanate coupling agent in an amount effective to inhibit the migration of tannins from said substrate into said finish.

16. The coated substrate of claim 15, wherein said organotitanate coupling agent is about 0.1% by weight to about 2% by weight based on the weight of said pigment.

17. The coated substrate of claim 15, wherein said substrate containing tannin is a material selected from the group consisting of wood, paper, cardboard, plywood, particle board, chip board, and strand board.

18. The coated substrate of claim 15 comprising redwood, pine, spruce, cedar, maple.

19. The coated substrate of claim 15 wherein said wood substrate containing tannin is a wood selected from the group consisting of redwood, cedar, white pine, yellow pine and oak.

20. A pigment composition comprising a neoalkoxytitanate coupling agent in an amount effective to inhibit the migration of tannins from a tannin containing substrate.

21. The pigment of claim 20, wherein said neoalkoxytitanate coupling agent is about 0.1% by weight to about 2% by weight, based on the weight of said pigment.

22. The pigment of claim 20 wherein said neoalkoxytitanate has at least one amine functionality.

23. The pigment of claim 20 wherein said neoalkoxytitanate is selected from the group consisting of neoalkoxy-tri(N-ethylaminoethylamino) titanate and neoalkoxy-tri(dioctylphosphato) titanate.

* * * * *